United States Patent
Reiner et al.

(10) Patent No.: US 9,108,252 B2
(45) Date of Patent: Aug. 18, 2015

(54) MODULAR DRILL WITH DIAMOND CUTTING EDGES

(75) Inventors: Kent L. Reiner, Latrobe, PA (US); Dan Elwyn Chesney, Colorado Springs, CO (US); Jai Prasad, Rio Rancho, NM (US)

(73) Assignee: KENNAMETAL INC., Latrobe, PA (US)

( * ) Notice: Subject to any disclaimer, the term of this patent is extended or adjusted under 35 U.S.C. 154(b) by 704 days.

(21) Appl. No.: 13/011,097

(22) Filed: Jan. 21, 2011

(65) Prior Publication Data

US 2012/0189393 A1    Jul. 26, 2012

(51) Int. Cl.
*B23B 51/04*      (2006.01)

(52) U.S. Cl.
CPC ........... *B23B 51/048* (2013.01); *B23B 2222/88* (2013.01); *B23B 2226/27* (2013.01); *B23B 2226/315* (2013.01); *B23B 2251/60* (2013.01); *B23B 2260/104* (2013.01); *Y10T 407/23* (2015.01); *Y10T 408/04* (2015.01); *Y10T 408/21* (2015.01); *Y10T 408/78* (2015.01); *Y10T 408/81* (2015.01); *Y10T 408/88* (2015.01); *Y10T 408/906* (2015.01)

(58) Field of Classification Search
CPC ... Y10T 407/23; Y10T 407/26; Y10T 408/78; Y10T 408/81; Y10T 408/905; Y10T 408/906; Y10T 408/9065
USPC ................. 408/1 R, 144, 145, 223, 224, 225; 407/113, 118
See application file for complete search history.

(56) References Cited

U.S. PATENT DOCUMENTS

| 2,294,969 | A | * | 9/1942 | Engvall et al. | 408/224 |
| 4,225,274 | A | * | 9/1980 | Katz | 408/225 |
| 4,340,327 | A | * | 7/1982 | Martins | 408/59 |
| 4,353,670 | A |  | 10/1982 | Jorgensen |  |
| 4,934,881 | A | * | 6/1990 | Tsujimura et al. | 407/42 |
| 5,071,295 | A |  | 12/1991 | Greig |  |
| 5,230,593 | A | * | 7/1993 | Imanaga et al. | 408/230 |
| 5,772,756 | A |  | 6/1998 | Davies et al. |  |
| 5,813,804 | A | * | 9/1998 | Erdel | 408/145 |
| 5,904,455 | A |  | 5/1999 | Krenzer et al. |  |

(Continued)

FOREIGN PATENT DOCUMENTS

| CN | 101094807 A | 12/2007 |
| DE | 9407197 | 6/1994 |

(Continued)

OTHER PUBLICATIONS

Graham, "Turning difficult-to-machine alloys: the special properties of superalloys and titanium alloys call for special machining considerations," Modern Machine Shop, Jul. 2002, 13 pages.

(Continued)

*Primary Examiner* — Daniel Howell
*Assistant Examiner* — Michael Vitale
(74) *Attorney, Agent, or Firm* — Larry R. Meenan (57) ABSTRACT

A modular drill for machining applications includes a central pilot drill made of cemented carbide and outboard radial inserts having cutting edges with a diamond surface. Additionally, the diamond surface associated with the cutting edges includes indicia identifying each cutting edge, such that indexing of the inserts is made easier. To ensure the indicia withstands the harsh machining environment, the indicia is laser etched onto the diamond surface of the insert.

16 Claims, 7 Drawing Sheets

(56) References Cited

U.S. PATENT DOCUMENTS

| | | | |
|---|---|---|---|
| 6,190,096 B1* | 2/2001 | Arthur | 407/113 |
| 6,257,807 B1* | 7/2001 | Heinloth | 407/113 |
| 7,244,081 B2* | 7/2007 | Johnson et al. | 408/224 |
| 7,306,410 B2 | 12/2007 | Borschert et al. | |
| 2004/0057804 A1 | 3/2004 | Jager et al. | |
| 2004/0123801 A1 | 7/2004 | Lee et al. | |
| 2004/0228694 A1* | 11/2004 | Webb et al. | 407/113 |
| 2006/0115408 A1 | 6/2006 | Akaishi et al. | |
| 2008/0138162 A1* | 6/2008 | Webb et al. | 407/113 |
| 2009/0127506 A1 | 5/2009 | Twitchen et al. | |
| 2009/0129881 A1 | 5/2009 | Kawade | |
| 2010/0028246 A1 | 2/2010 | Stromann et al. | |
| 2010/0098505 A1* | 4/2010 | Garrick et al. | 407/113 |
| 2010/0183384 A1* | 7/2010 | Kruszynski et al. | 407/67 |
| 2010/0272525 A1* | 10/2010 | Corbin | 407/113 |
| 2010/0278603 A1* | 11/2010 | Fang et al. | 408/144 |

FOREIGN PATENT DOCUMENTS

| | | |
|---|---|---|
| EP | 358901 | 3/1990 |
| JP | 57201113 | 12/1982 |
| WO | WO-2004016377 | 2/2004 |

OTHER PUBLICATIONS

"CVD (Chemical Vapour Deposition): Diamond for Dressing and Cutting Tool Applications," Element Six Brochure, Aug. 11, 2009, 12 pages.

"Where Does Diamond Make Sense in Machining Titanium?" Modern Machine Shop, Mar. 27, 2009, Gardner Publications, Inc., 1 page.

* cited by examiner

MODULAR DRILL WITH DIAMOND CUTTING EDGES

BACKGROUND OF THE INVENTION

1. Field of the Invention

The invention relates to a modular drill with indexable cutting inserts having diamond cutting edges.

2. Background of the Invention

Figure 1:
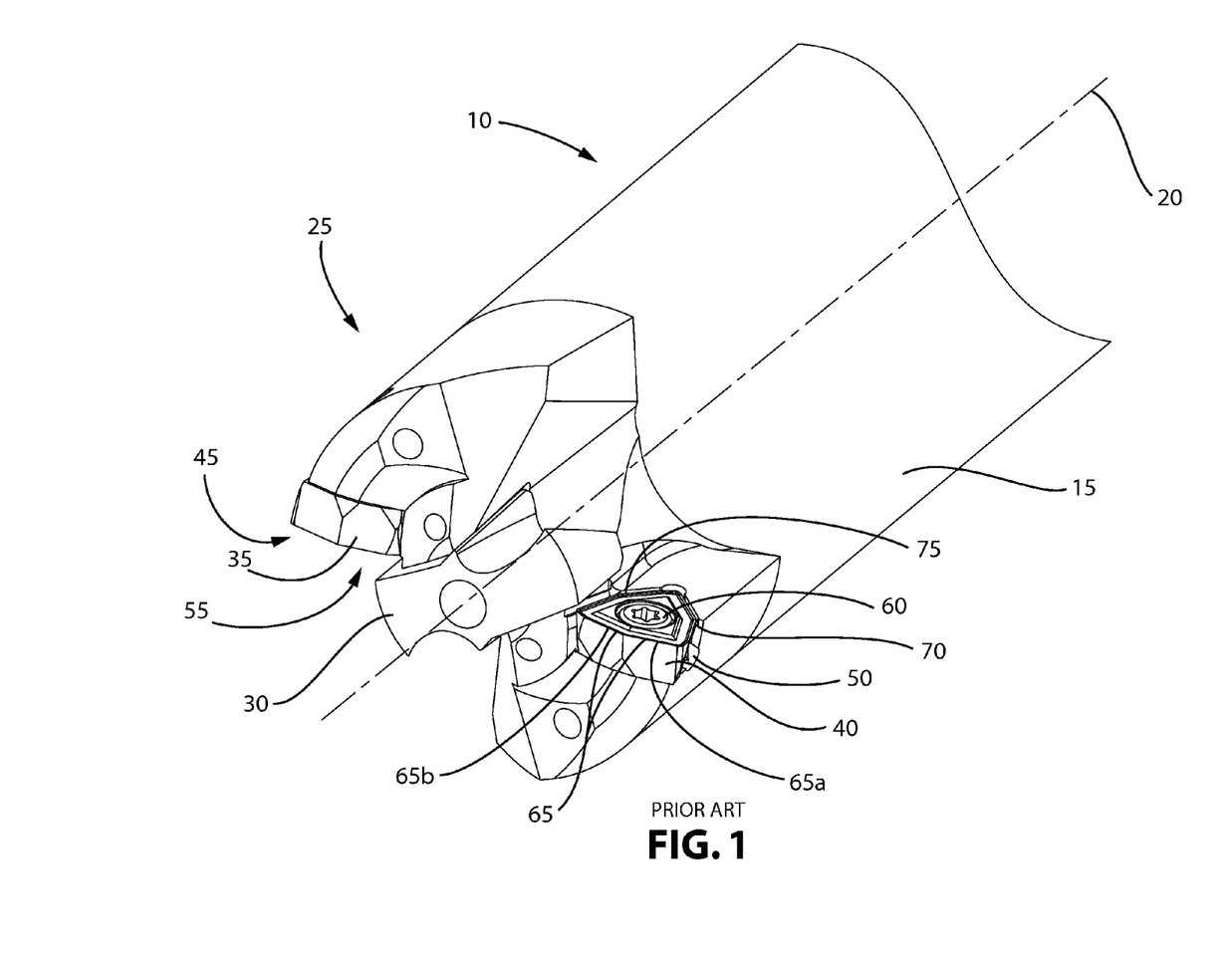
FIG. 1, which is prior art, illustrates a perspective view of a modular drill.

A modular drill is a drill consisting of interchangeable and disposable tips mechanically attached to a drill body. FIG. 1 illustrates such a modular drill 10 having a shank 15 extending along a longitudinal axis 20. The front end 25 of the drill 10 is moved axially along the longitudinal axis 20 such that a central pilot drill 30 and outboard inserts 35, 40 engage a workpiece and produce a hole extending therethrough. Typically, such modular drills have utilized a central pilot drill 30 comprised of cemented carbide and the outboard inserts 35, 40 also comprised of cemented carbide, which may or may not have coatings thereupon. However, while this configuration may be suitable for some materials, the applicants have found that such a configuration is undesirable when machining materials such as fiberglass. In particular, fiberglass material tends to build up on the cutting edges of the cemented carbide inserts and, as a result, their effectiveness for machining fiberglass is greatly reduced by this and additionally by abrasive wear. For different reasons, these same inserts are not suitable for machining titanium. In particular, titanium is known for its toughness and typical cemented carbide inserts do not have the properties necessary for machining this material. As illustrated in FIG. 1, outboard inserts 35, 40 are secured within a pocket 45, 50 by hold-down screws 55, 60 and, generally speaking, with attention directed to insert 40, include three cutting edges 65, 70, 75. Each cutting edge 65, 70, 75 for this particular cutting insert 40, includes, for example, a first cutting edge segment 65a and a second cutting edge segment 65b. The general configuration of insert 40 is known in the industry as a trigon shaped insert. For simplicity, outboard inserts 40 will be discussed with the understanding that the same discussion applies to the outboard insert 35.

The central pilot drill 30 protrudes from the front end 25 of the drill 10 and is the first portion of the drill 10 to contact the workpiece. In the past, the outboard inserts 35, 40 were comprised entirely of a cemented carbide substrate with coatings thereupon while the central pilot drill 30 has been comprised of a similar material. However, this design is not well suited for machining fiberglass because of abrasive wear and because the cutting edges of the carbide inserts encounter a build-up of fiberglass material, thereby, not only dulling the cutting edge, but furthermore, degrading the quality of machining capable by the modular drill 10.

As illustrated in FIG. 1 and with respect to cutting insert 40, the hold-down screw 60 may be removed such that the outboard insert 40 may be indexed within the pocket 45 to present a new cutting edge, whether it be cutting edge 70 or 75 to the workpiece. Once properly indexed within the pocket 50, the hold-down screw 60 may again be tightened to secure the outboard insert 40 within the pocket 50.

A design is needed to enhance the capability of the modular drill 10 so that it is capable of effectively machining fiberglass and/or titanium.

Additionally, it may be difficult to determine whether a cutting edge 65, 70, 75 has already been used for a machining operation. Depending upon the insert wear, the insert either should not be used again or should be used for a limited time. In the past, typically, the surface of inserts has been marked with inkjet print to identify cutting edges and to permit them to be indexed in a sequence. However, the inkjet printed labels frequently cannot withstand the harsh operating conditions experienced by the cutting insert and, under these circumstances. The inkjet printed label wears off such that it is no longer visible. Therefore, a design is needed to label the top surface of the cutting inserts 35, 40 such that not only can each label withstand the harsh conditions during a machining operation, but furthermore, each label will retain its visibility such that, after a machining operation, the cutting insert may be easily indexed based upon the pre-existing indicia on the face of the insert.

SUMMARY OF THE INVENTION

A modular drill for machining applications has a generally cylindrical body with peripheral walls about a central longitudinal axis and with an upper end. The modular drill comprises a centrally located pilot drill protruding from the upper end along the longitudinal axis; at least two cutting inserts. Each cutting insert has a top surface, a bottom surface and a plurality of sides therebetween with a cutting edge defined at the intersection of the top and side surfaces. A cutting edge from each insert extends axially from the upper end of the body and is operative to engage a workpiece, and wherein each operative cutting edge extends in a radial direction such that, when viewed along the central axis toward the upper end, the operative cutting edges combine to completely overlap the radial distance extending from the pilot drill to the peripheral walls. The pilot drill is made of a non-diamond, and wherein the operative cutting edge of each of the cutting inserts has a diamond surface.

A method of machining GFRP (glass fiber reinforced plastics) or fiberglass workpiece materials is also described. The method uses a modular drill as just described. The method comprises the steps of positioning the modular drill adjacent to the fiberglass workpiece, and advancing the modular drill into the workpiece to the desired depth. The same method steps may be utilized for a method of machining titanium.

DETAILED DESCRIPTION OF THE INVENTION

Figure 2:
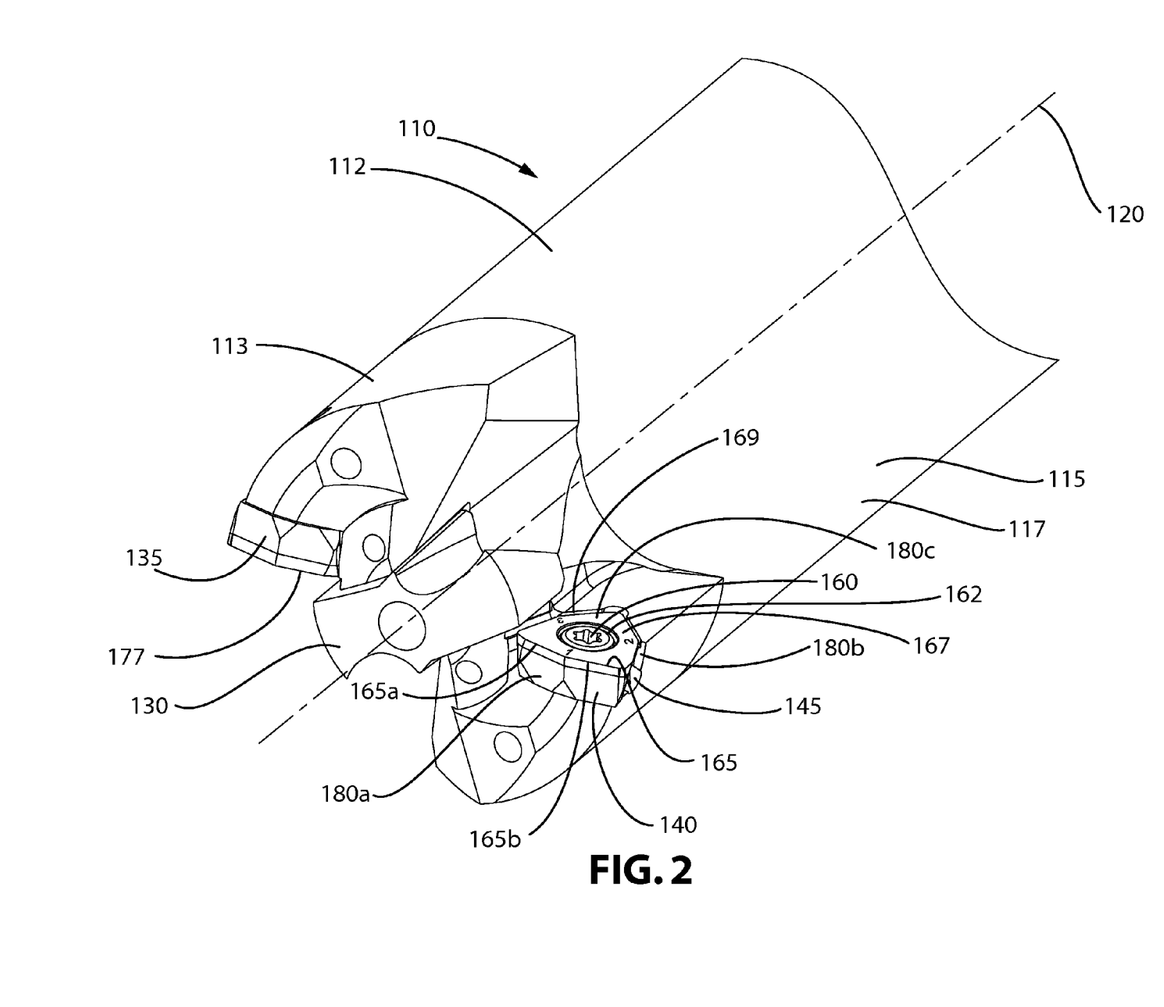
FIG. 2 illustrates a perspective view of a modular drill in accordance with the subject invention.

FIG. 2 illustrates a perspective view of a modular drill very similar to that illustrated in FIG. 1, with the exception that the operative cutting edge 165 of the outboard insert 140 has a diamond surface. For convenience, the reference numbers will be incremented by 100 for comparable parts of FIG. 2 originally described with respect to FIG. 1.

The modular drill 110 includes a second outboard insert 135 identical to insert 140 For convenience; only insert 140 will be described with the understanding that the same features are applicable to insert 135.

Figure 3:
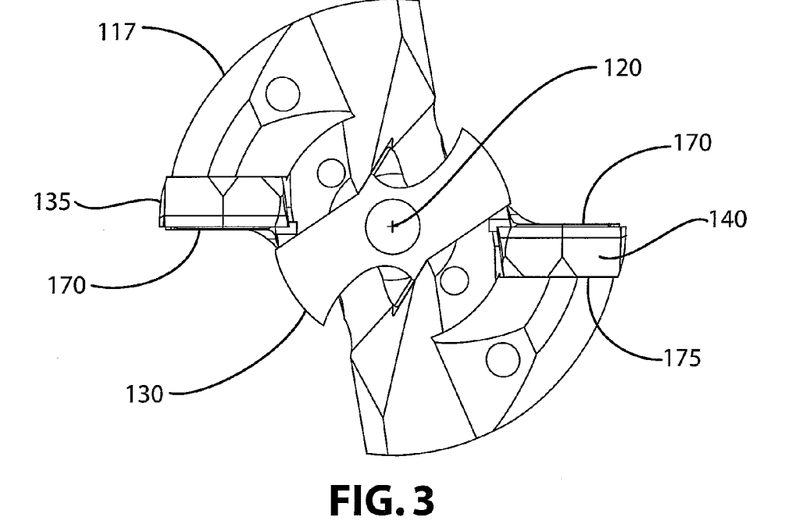
FIGS. 3 and 4 illustrate an end view and a side view of the modular drill found in FIG. 2.
Figure 4:
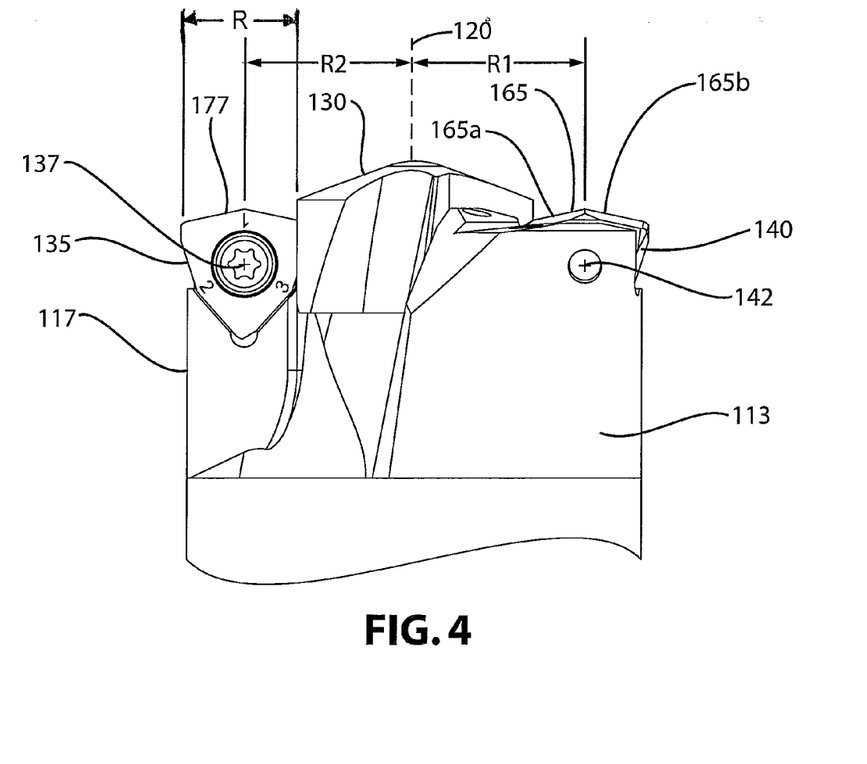

The description of the perspective drawing of the modular drill 110 shown in FIG. 2 will be further illustrated with the end view found in FIG. 3 and the side view found in FIG. 4.

FIGS. 2-4 illustrate a modular drill 110 for machining applications, whereby the modular drill 110 has a generally cylindrical body or shank 115 with a peripheral wall 117 about a central longitudinal axis 120. The body 112 has an upper end 113.

The modular drill 110 includes a centrally located pilot drill 130 protruding from the upper end 113 along the longitudinal axis 120. At least two cutting inserts 135, 140 are mounted upon the body 112 at the upper end 113, wherein each cutting insert, for example, insert 140, includes a top surface 170, a bottom surface 175, and a plurality of sides 180a, 180b, 180c therebetween with cutting edges 165, 167, 169 defined at the intersection of the top surface 170 and the side surfaces 180a, 180b, 180c respectively. It should be appreciated that, with respect to insert 140, it is possible to have three cutting edges 165, 167, 169 are illustrated, however; in at least one embodiment of the subject invention it is possible for the cutting insert 140 to include only a single cutting edge 165.

Additionally, it should also be noted that, while reference has been made to cutting edge 165, the insert 140 is known as a trigon and, while the discussion is directed to a single cutting edge 165, it should be appreciated that this single cutting edge 165 is comprised of cutting edge segment 165a and cutting edge segment 165b, which are angled relative to one another and together engage the workpiece together during a machining operation. As can be seen in FIGS. 2, 3, and 4, the cutting edge 165 from insert 140 protrudes axially from the upper end 113 of the body 112 and is operative to engage a work piece. This feature is best illustrated in FIG. 4.

As best illustrated in FIGS. 2-4, the operative cutting edge 165 of insert 140 and the matching cutting edge 177 associated with insert 135 extend in a radial direction such that when viewed along the central longitudinal axis 120, as seen in FIG. 3, the operative cutting edges 165, 177 completely overlap the radial distance R extending from the central pilot drill 130 to the peripheral wall 117. This is achieved by staggering the radial distances of the inserts 135, 140 from the central longitudinal axis 120. In particular, as seen in FIG. 4, the center 142 of insert 140 is located at a distance R1 from the centerline 120 while the center 137 of insert 135 is located at a radial distance of R2 from the central longitudinal axis 120 and these radial distances are different to provide the above-mentioned overlap.

The inventors have learned that the drill performance when either fiberglass or titanium is the workpiece is greatly enhanced when the operative cutting edges 165, 177 of the cutting insert 135, 140 have a diamond surface. Under these circumstances, it is acceptable for the central pilot drill 130 to be made of a non-diamond material such as cemented carbide and, as a result, superior performance can be achieved without the need to provide a diamond surface on the cutting edges of the central pilot drill 130.

There are at least two common ways in which the cutting edges 165, 177 of the cutting inserts 140, 145 can have a diamond surface.

Figure 5:
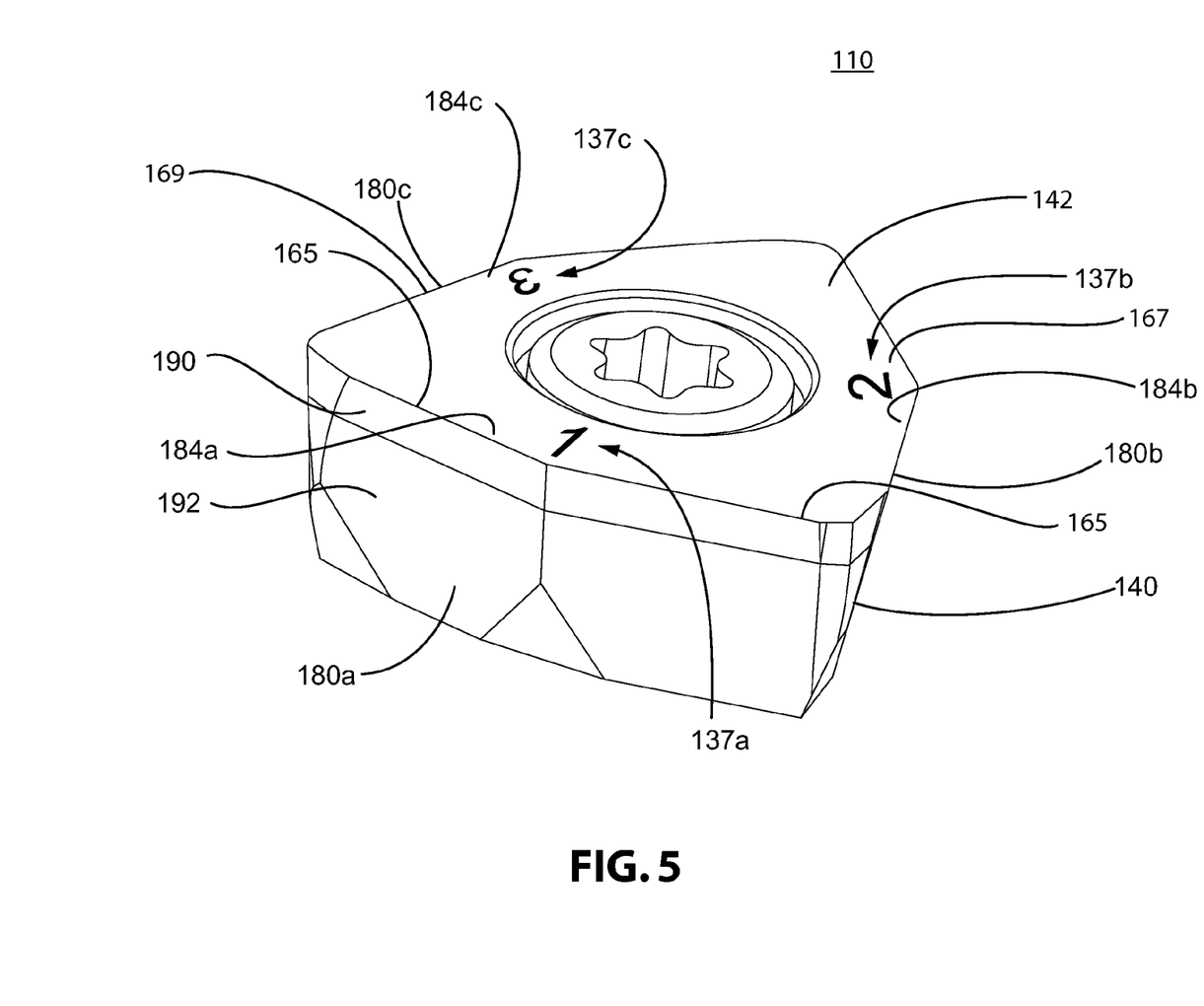
FIG. 5 is a perspective view of an insert for the modular drill in accordance with the subject invention.
Figure 6:
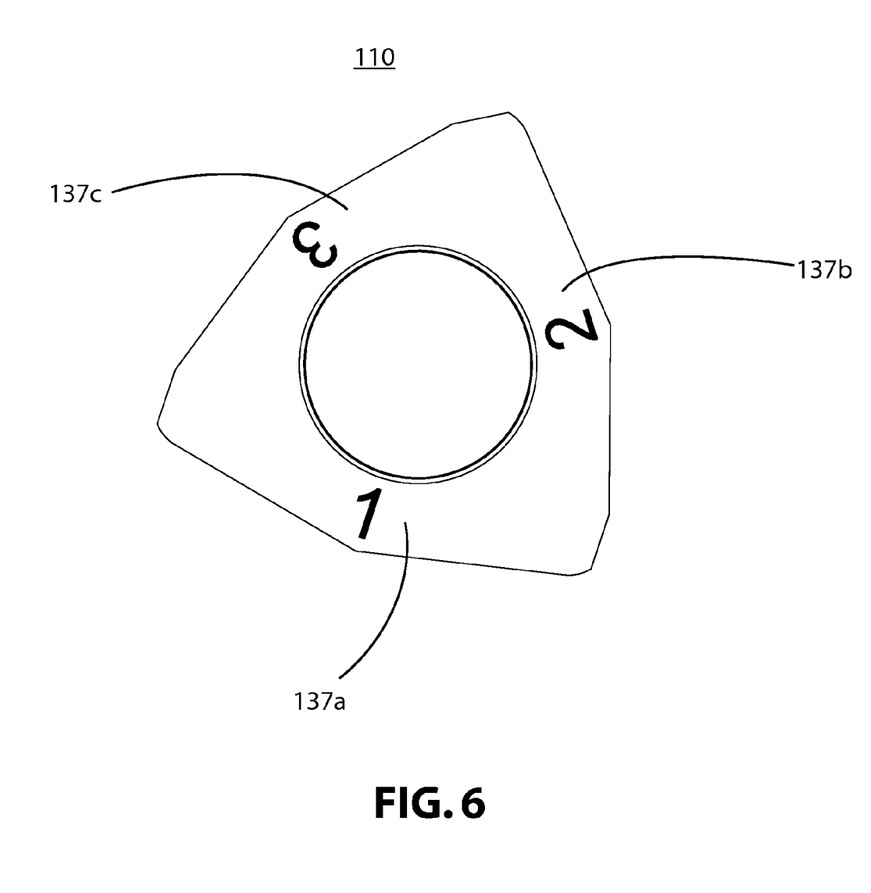
FIG. 6 is a top view of the cutting insert illustrated in FIG. 5.

FIGS. 5 and 6, which illustrate the insert, used in FIGS. 2-4, shows in more detail insert 140 which has a full face diamond layer 190 and the operative cutting edge 165 is integral with this fall face diamond layer 190. The drill face diamond layer 190 may be mounted upon a base 192 of any materials sufficient to support the diamond layer 190. The base 192 may be made of a cemented carbide material. Full face diamond layer inserts are commercially available through Kennametal Inc. as grade KD 1425 as segmented or Style CCGW-S or TPGW-E/F (ST) and this same technology is used to apply full face diamond layers to the inserts associated with the subject invention. The insert shapes may be trigon, square, triangle, rectangle, circular or others. The trigon is illustrated in FIG. 7.

In a preferred embodiment, the diamond layer 190 is polycrystalline diamond.

Figure 7:
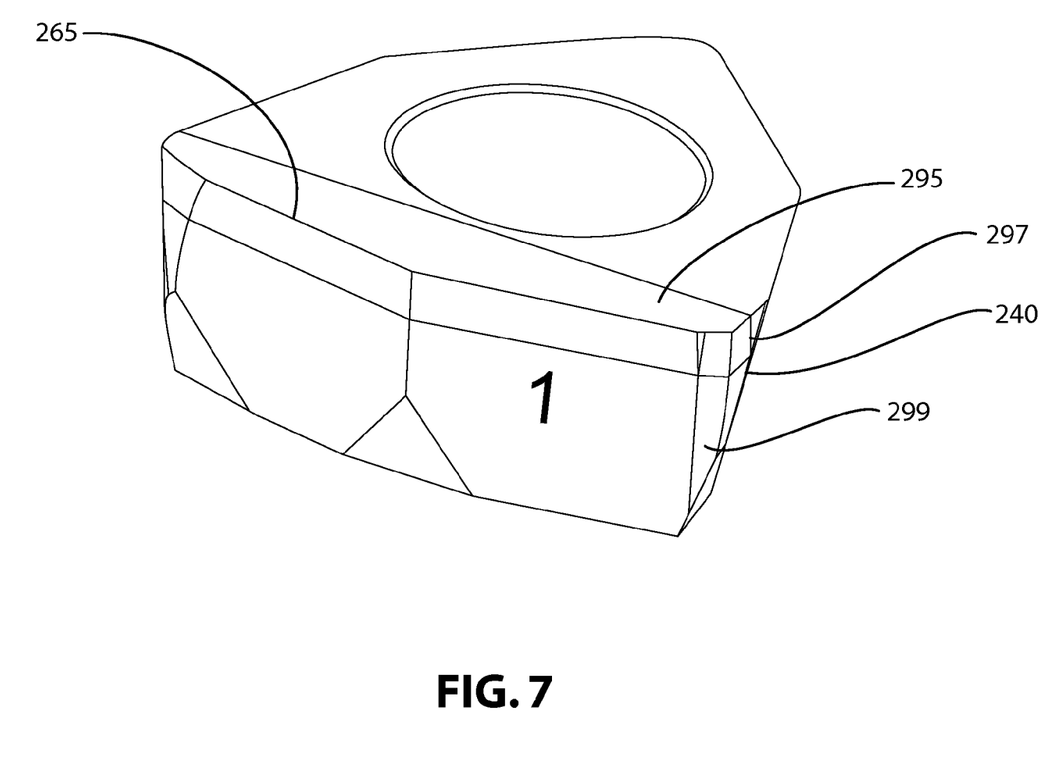
FIG. 7 is a perspective view of another embodiment of the cutting insert in accordance with the subject invention.

FIG. 7 illustrates an alternate embodiment of a cutting insert 240 once again having an operative cutting edge 265 with a diamond surface similar to that of insert 140 illustrated in FIG. 5. However, this diamond surface is now achieved utilizing a diamond tip 295 brazed within the pocket 297 within the substrate 299 of the insert 240. Such inserts are commercially available through Kennametal Inc. as Grade KD 1425 Style SPHX and even though this particular insert is an 80 degree diamond shaped insert, the same technology may be applied to other shapes, such as the trigon illustrated in FIG. 7.

Briefly returning to FIG. 2, in one embodiment of the subject invention, the outboard inserts 135, 140 have operative cutting edges 165, 177 with diamond surfaces, while the central pilot drill 130 is made entirely of a cemented carbide substrate. As the modular drill 110 rotates against the workpiece, the tangential velocity of the operative cutting edges 165, 177 is much greater than the tangential velocity of the central pilot drill 130 and the amount of material removed by the outboard inserts 135, 140 is much greater than that material removed by the central pilot drill 130. Therefore, the operating conditions for the central pilot drill 130 are much less harsh than those conditions for the outboard insert 135, 140. Therefore, the central pilot drill 130 does not need to be as robust as the outboard inserts 135, 140. As a result, in one embodiment of the subject invention, the central pilot drill 130 may be made entirely of a cemented carbide substrate, while the outboard inserts 135, 140 may have cutting edges 165, 177 with a diamond surface. This configuration provides the benefit of the diamond cutting edges 165, 177 where they are needed most and permits a reduction in cost by maintaining the central pilot drill 130 as a cemented carbide substrate which has a significantly lower cost than the cutting inserts having cutting edges with diamond surfaces.

As illustrated in FIG. 2, insert 140 has sides 180a, 180b, 180c and typically, these sides are identical such that the cutting insert 140 may be indexed within the pocket 145 to provide fresh cutting edges to the workpiece. In particular, hold-down screw 160 is removed and the insert 140 is reoriented within the pocket 145 to provide a fresh cutting edge and thereafter secured within the pocket 145 by tightening the hold-down screw 160. It should be noted that, while cutting insert 140 is shown with a hold-down screw 160, it is not necessary for the insert 140 to be secured using a hold-down screw 160 and the bore through which the hold-down screw 160 extends may be eliminated and other methods of securing the insert 140 within the pocket 145, such as a standard clamp, may also be utilized. Additionally, the benefits of the subject invention exist whether or not the insert 140 is indexable. However, having an indexable insert 140 improves the efficiency of the tool.

In a further embodiment of the subject invention, the outboard inserts 135, 140 include indicia 137a, 137b, 137c identifying the respective cutting edges 180a, 180b, 180c.

As indicated in FIG. 5, the indicia 137a, 137b, 137c are located on the top of the insert 140 where they are clearly visible during a machining operation. In the past these indicia have been located in other areas such as on the sides 180a, 180b, 180c. However, when this occurs, it is much more difficult for an operator to see such indicia and, therefore, such markings are not as useful. It is preferred that the indicia 137a, 137b, 137c be located as close to the cutting edges 180a, 180b, 180c as possible and preferably, on the rake surface 184a, 184b, 184c as close as possible to and centrally located on the cutting edges 165, 167, 169 while indicia located on the sides 180a, 180b, 180c of the insert are still useful, indicia 137a, 137b, 137c indicia on the top 142 are preferred.

As illustrated in FIG. 5, the indicia 137a, 137b, 137c are numerals. However, any symbols that make identification of the cutting edges distinguishable may be utilized including numbers, letters, or symbols.

Of particular interest, in order to place indicia 137a, 137b, 137c upon the full face diamond layer 190, it is necessary to laser etch this indicia 137a, 137b, 137c upon the surface of the diamond layer 190. The inventors have observed that, due to the harsh operating conditions the inserts 135, 140 experience, indicia deposited utilizing inkjet printing is not sufficient, and therefore, laser etching is necessary. The combination of laser etching indicia on the top surface of the insert 140 has not only provided durability for the indicia marking, but furthermore, has assisted the operator in identifying the respective cutting edges such that indexing the cutting insert to a fresh cutting edge has been made easier.

Briefly returning to FIGS. 2-4, it should be apparent that the cutting inserts 135, 140 are positioned about the pilot drill 130 along lines that form symmetric angles about the longitudinal axis 120. The radial locations of cutting inserts 125, 135, 140 are staggered such that the cumulative coverage of the cutting inserts 135, 140 cover the perimeter of the central pilot drill 130 to the periphery 117 of the body 112. This symmetric arrangement assists in balancing of this rotating tool.

What has been discussed so far is a modular drill 110 having two outboard inserts 135, 140 positioned about a central pilot drill 130, wherein each of these inserts 135, 140 has a trigon shape. The features of this invention are not limited to such a design and may be applicable to modular drills having additional inserts.

Figure 8:
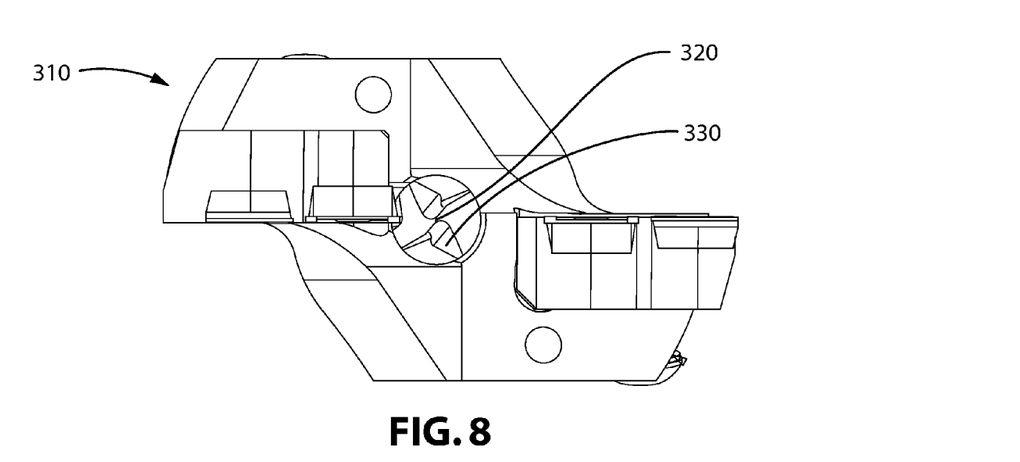
FIGS. 8 and 9 are an end view and side view of another modular drill.
Figure 9:
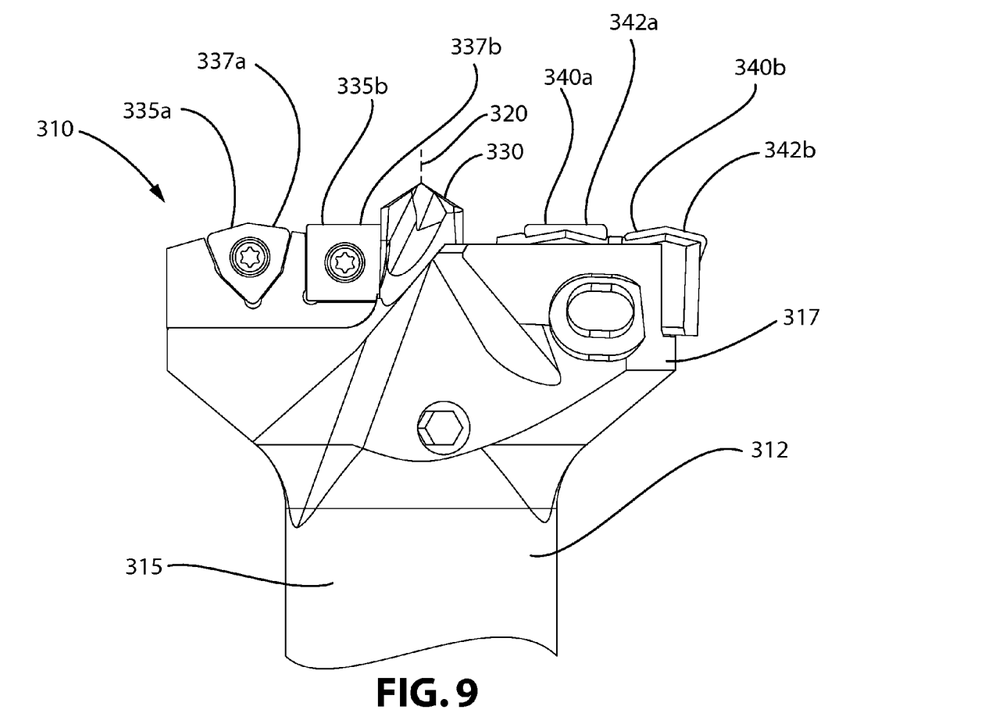

FIGS. 8 and 9 illustrate a modular drill 310 having a shank 315 about a central longitudinal axis 320. The modular drill 310 has a body 312 with a front end 325 having a central pilot drill 330 attached thereto. The features of modular drill 310 are similar to that of modular drill 110 with the exception that there are multiple outboard inserts 335a, 335b and 340a, 340b located about the central pilot drill 330. Just as with respect to the embodiment of modular drill 110, the outboard inserts 335a, 335b and 340a, 340b may have cutting edges 337a, 337b, 342a, 342b with diamond surfaces just as those previously discussed inserts 135, 140. Of particular note, however, the cutting inserts 335a, 335b and 340a, 340b could have a generally rectangular, square, or trigon shape. Aside from their rectangular shape, the manner in which these inserts 335a, 335b, 340a, 340b may be secured within the pocket of the modular drill 310 are similar to those techniques previously discussed. Additionally, the manner by which the cutting edges 337a, 337b, 342a, 342b may be a diamond surface are similar to those manners previously discussed with respect to cutting inserts 135, 140.

While the cutting inserts 335a, 335b, 340a, 340b have been illustrated as rectangular, it should be appreciated that, for different purposes, the modular drill 310 may have different insert shapes including trigon, triangle, and square and a selection of the shape of these inserts is only a function of the desired use for the particular modular drill.

It should again be appreciated that the cutting inserts 335a, 335b, 340a, 340b are positioned about the pilot drill 320 along lines that form symmetric angles about the longitudinal axis 320.

Also, once again, it should be appreciated that the radial location of the inserts 335a, 335b, 340a, 340b are staggered such that the accumulative coverage of the cutting inserts 335a, 335b, 340a, 340b cover the entire radius from the perimeter of the central pilot drill 330 to the periphery 317 of the body 312.

The inventors expect this same drill to perform very favorably when machining titanium and other difficult to machine materials and, for that reason, this design provides a versatile solution to machining a variety of hard-to-machine materials.

The subject invention is also directed to a method of machining a workpiece; in particular, fiberglass or titanium, whereby the subject invention is positioned adjacent to the titanium or fiberglass workpiece and the modular drill is then advanced into the workpiece to the desired depth.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. A modular drill for machining applications, wherein the modular drill has a generally cylindrical body with peripheral walls about a central longitudinal axis and with an upper end, wherein the modular drill comprises:
   a. a centrally located pilot drill protruding from the upper end along the longitudinal axis;
   b. at least two cutting inserts, wherein each cutting insert has a top surface, a bottom surface and a plurality of sides therebetween with a cutting edge defined at the intersection of the top and side surfaces; wherein a cutting edge from each insert protrudes axially from the upper end of the body and is operative to engage a workpiece;
   c. wherein each operative cutting edge extends in a radial direction such that, when viewed along the central axis toward the upper end, the operative cutting edges combine to completely overlap the radial distance extending from the pilot drill to the peripheral walls;
   d. wherein the pilot drill is made of a non-diamond material;
   e. wherein the operative cutting edge of each of the cutting inserts has a diamond surface;
   f. wherein a center of at least one of the cutting inserts is at a first radial distance from the central longitudinal axis and a center of at least one of the cutting inserts is at a second radial distance from the central longitudinal axis and the first radial distance is different from the second radial distance; and
   g. wherein the cutting inserts have a shape of a trigon.

2. The modular drill according to claim 1, wherein each insert has a full face diamond layer thereupon and the operative cutting edge of each insert is integral with this diamond layer.

3. The modular drill according to claim 2, wherein the diamond layer is polycrystalline diamond.

4. The modular drill according to claim 2, wherein each insert has a diamond tip brazed thereupon and the operative cutting edge of each insert is integral with this diamond tip.

5. The modular drill according to claim 1, wherein the central pilot drill is made of a cemented carbide substrate.

6. The modular drill according to claim 1, wherein the central pilot drill is made from coated cemented carbide.

7. The modular drill according to claim 1, wherein each cutting insert has multiple cutting edges and the insert may be indexed in the modular drill body to present different cutting edges as the operative cutting edge.

8. The modular drill according to claim 7, wherein the cutting inserts may have a shape of one from the group consisting of trigon, rectangle, triangle, and square.

9. The modular drill according to claim 7, further including indicia on the surface of each insert, wherein the indicia identifies the cutting edges of the cutting inserts.

10. The modular drill according to claim 9, wherein the indicia is located on the top of each insert.

11. The modular drill according to claim 10, wherein the indicia is located on the rake surface on the top of each insert.

12. The modular drill according to claim 9, wherein the indicia is located upon the side of each insert.

13. The modular drill according to claim 9, wherein the indicia are numbers, letters or symbols.

14. The modular drill according to claim 13, wherein the indicia is laser etched upon the surface of the cutting insert.

15. The modular drill according to claim 1, wherein the cutting inserts positioned on either side of the pilot drill are symmetric.

16. A modular drill for machining applications wherein the modular drill has a generally cylindrical body with peripheral walls about a central longitudinal axis and with an upper end, wherein the modular drill comprises:
 a. a centrally located pilot drill protruding from the upper end along the longitudinal axis,
 b. at least two cutting inserts, wherein each cutting insert has a top surface, a bottom surface and a plurality of sides therebetween with a cutting edge defined at the intersection of the top and side surfaces; wherein a cutting edge from each insert protrudes axially from the upper end of the body and is operative to engage a workpiece;
 c. wherein each operative cutting edge extends in a radial direction such that, when viewed along the central axis toward the upper end, the operative cutting edges combine to completely overlap the radial distance extending from the pilot drill to the peripheral walls,
 d. wherein the pilot drill is made of a non-diamond material; and
 e. wherein the operative cutting edge of each of the cutting inserts has a full face polycrystalline diamond layer thereupon and the operative cutting edge of each insert is integral with this diamond layer;
 f. wherein the rake surface of each insert has indicia to identify the cutting edges of the cutting insert;
 g. wherein a center of at least one of the cutting inserts is at a first radial distance from the central longitudinal axis and a center of at least one of the cutting inserts is at a second radial distance from the central longitudinal axis and the first radial distance is different from the second radial distance; and
 h. wherein the cutting inserts have a shape of a trigon.

* * * * *